(12) United States Patent
Sato et al.

(10) Patent No.: US 10,112,668 B2
(45) Date of Patent: Oct. 30, 2018

(54) HEAD LAMP DEVICE OF STRADDLE-TYPE VEHICLE

(71) Applicants: KAWASAKI JUKOGYO KABUSHIKI KAISHA, Kobe-shi, Hyogo (JP); KOITO MANUFACTURING CO., LTD., Tokyo (JP)

(72) Inventors: Toru Sato, Akashi (JP); Kaoru Kouchi, Kakogawa (JP); Akira Saijyo, Shizuoka (JP); Hiroyuki Harada, Shizuoka (JP)

(73) Assignees: KAWASAKI JUKOGYO KABUSHIKI KAISHA, Kobe-shi, Hyogo (JP); KOITO MANUFACTURING CO., LTD., Tokyo (JP)

( * ) Notice: Subject to any disclaimer, the term of this patent is extended or adjusted under 35 U.S.C. 154(b) by 24 days.

(21) Appl. No.: 15/589,816

(22) Filed: May 8, 2017

(65) Prior Publication Data
US 2017/0327170 A1  Nov. 16, 2017

(30) Foreign Application Priority Data
May 10, 2016 (JP) ................................ 2016-094211

(51) Int. Cl.
*B62J 6/02* (2006.01)
*B60Q 1/04* (2006.01)

(52) U.S. Cl.
CPC .............. *B62J 6/02* (2013.01); *B60Q 1/0408* (2013.01)

(58) Field of Classification Search
CPC ...... B60Q 1/0047; B60Q 1/0094; B60Q 1/04; B60Q 1/0408; B60Q 1/0483; B62J 17/02;
(Continued)

(56) References Cited

U.S. PATENT DOCUMENTS

| 6,439,753 B1 * | 8/2002 | Sumada | B60Q 1/0041 |
| | | | 362/475 |
| 2014/0003078 A1 * | 1/2014 | Monma | B62J 6/02 |
| | | | 362/516 |

(Continued)

FOREIGN PATENT DOCUMENTS

| JP | S639497 Y2 | 3/1988 | |
| JP | 2014117994 A * | 6/2014 | ................ B62J 6/02 |
| JP | 2017061315 A * | 3/2017 | ................ B62J 6/02 |

*Primary Examiner* — Hargobind S Sawhney
(74) *Attorney, Agent, or Firm* — Alleman Hall Creasman & Tuttle LLP (57) ABSTRACT

A head lamp device of a straddle-type vehicle, comprises a housing; a pair of light units which are disposed at right and left sides, respectively, in a rightward and leftward direction, and emit light in a forward direction; a pair of support point members which support the pair of light units, respectively; a pair of first tilt members which tilt the pair of light units, respectively in a first direction with respect to the housing; and a pair of second tilt members which tilt the pair of light units, respectively in a second direction with respect to the housing, the pair of support point members are disposed in outward regions, respectively, of the housing in the rightward and leftward direction, and the pair of first tilt members and the pair of second tilt members are disposed in a center region of the housing in the rightward and leftward direction.

8 Claims, 7 Drawing Sheets

(58) Field of Classification Search
CPC ........ B62J 6/00; B62J 6/02; B62J 6/18; F21S 41/00; F21S 41/143; F21S 41/19; F21S 41/192; F21S 41/334; F21S 41/657; F21S 43/00

See application file for complete search history.

(56) References Cited

U.S. PATENT DOCUMENTS

| | | | |
|---|---|---|---|
| 2014/0063826 A1* | 3/2014 | Noguchi | B62J 6/02 362/476 |
| 2015/0266410 A1* | 9/2015 | Takaya | B62J 6/02 362/476 |

* cited by examiner

HEAD LAMP DEVICE OF STRADDLE-TYPE VEHICLE

CROSS-REFERENCE TO THE RELATED APPLICATION

This application claims priority to and the benefit of Japanese Patent Application No. 2016-094211 filed on May 10, 2016, the entire disclosure of which is incorporated herein by reference.

BACKGROUND OF THE INVENTION

Field of the Invention

The present invention relates to a head lamp device of a straddle-type vehicle.

Description of the Related Art

Japanese Utility Model Application Publication No. Sho. 63-9497 discloses a head lamp device of a straddle-type vehicle such as a motorcycle, which is provided with an optical axis adjustment mechanism. The optical axis adjustment mechanism includes a support point member which supports a light unit in such a manner that the light unit is rotatable, and a plurality of screws which tilt the light unit in such a manner that the support point member is a support point.

In the head lamp device disclosed in Japanese Utility Model Application Publication No. Sho. 63-9497, the screws require elongated spaces in a forward and rearward direction for performing their functions. For this reason, even if the size of the light unit is reduced, the dimension in the forward and rearward direction of a region of the head lamp device, corresponding to the screws, cannot be reduced.

SUMMARY OF THE INVENTION

In view of the above-described circumstances, an object of the present invention is to provide a head lamp device of a straddle-type vehicle including an optical axis adjustment mechanism, which can reduce its size.

According to a first aspect of the present invention, a head lamp device of a straddle-type vehicle, comprises a housing; a pair of light units which are disposed at right and left sides, respectively, in a rightward and leftward direction in a state in which the pair of light units are accommodated in the housing, and emit light in a forward direction; a pair of support point members which support the pair of light units, respectively in such a manner that the pair of light units are rotatable; a pair of first tilt members which tilt the pair of light units, respectively in a first direction with respect to the housing in such a manner that the pair of support point members are support points; and a pair of second tilt members which tilt the pair of light units, respectively in a second direction with respect to the housing in such a manner that the pair of support point members are support points, wherein the pair of support point members are disposed in outward regions, respectively, of the housing in the rightward and leftward direction, and the pair of first tilt members and the pair of second tilt members are disposed in a center region of the housing in the rightward and leftward direction.

In accordance with this configuration, the first and second tilt members which require elongated spaces in the forward and rearward direction are disposed in the center region of the housing in the rightward and leftward direction, and the support point members which do not require elongated spaces in the forward and rearward direction are disposed in the outward regions, respectively, of the housing in the rightward and leftward direction. Therefore, a dimension in the forward and rearward direction of the outward regions in the rightward and leftward direction, of the head lamp device can be reduced. This makes it possible to reduce the size of the whole of the head lamp device of the straddle-type vehicle including the optical axis adjustment mechanisms.

Each of the pair of second tilt members and a corresponding one of the pair of first tilt members may be arranged in a vertical direction, and each of the pair of first tilt members and a corresponding one of the pair of support point members may be arranged on a horizontal line.

In accordance with this configuration, since a virtual line connecting the support point member to the second tilt member is tilted with respect to the horizontal direction and the vertical direction, the light unit is displaced in the vertical direction and in the horizontal direction at the same time, in the adjustment performed by use of the first tilt member. However, since a virtual line connecting the support point member to the first tilt member is the horizontal line, the light unit is displaced only in the vertical direction (namely, only around the horizontal line), in the adjustment performed by use of the second tilt member. Therefore, an operator performs the optical axis adjustment only in the horizontal direction by use of the first tilt member, and then performs the optical axis adjustment only in the vertical direction by use of the second tilt member. In this way, an operation for the optical axis adjustment is completed. Therefore, even in the configuration in which the virtual line connecting the support point member to the second tilt member is tilted with respect to the horizontal direction and the vertical direction, the operation for the optical axis adjustment does not become complex.

The pair of support point members may be disposed in an upper portion of the housing.

In accordance with this configuration, since the support point members disposed in the outward regions, respectively of the housing in the rightward and leftward direction, are located in the upper portion of the housing, a dimension in the vehicle width direction (rightward and leftward direction) of the lower portion of the housing of the head lamp device can be reduced. This makes it possible to reduce the width of the straddle-type vehicle at a height position of the lower portion of the head lamp device.

The pair of light units may include light emission regions, respectively, which are apart from each other in the rightward and leftward direction and emit the light, and the pair of first tilt members and the pair of second tilt members may be disposed between the light emission regions in the rightward and leftward direction.

In accordance with this configuration, the first and second tilt members can be easily disposed to overlap with the light units when viewed from the side (in a side view). As a result, the dimension in the forward and rearward direction of the head lamp device can be reduced.

The pair of light unit may include light emission regions which are apart from each other in the rightward and leftward direction and emit the light, and the pair of support point members may be disposed outward in the rightward and leftward direction relative to the light emission regions, respectively.

In accordance with this configuration, since the dimension in the forward and rearward direction of the support point members is smaller than that of the first and second tilt members, a dimension in the forward and rearward direction of the outward regions of the head lamp device can be reduced.

Each of the pair of light units may includes a LED light source, and a reflector which reflects in a forward direction the light emitted from the LED light source.

In accordance with this configuration, the LED light sources have a small light emission angle, the size of the reflector can be reduced, the dimension in the forward and rearward direction of the light unit can be reduced. The reduction of the size of the light unit significantly affects the spaces of the first and second tilt members which impede reduction of the dimension in the forward and rearward direction of the housing. However, with the above-described configuration, the size of the head lamp device can be reduced.

The head lamp device may be fastened to a vehicle body frame of the straddle-type vehicle.

In accordance with this configuration, since the dimension in the forward and rearward direction of the outward regions in the rightward and leftward direction of the head lamp device can be reduced, interference between the head lamp device and a handle can be prevented during rotation of the handle, and the head lamp device can be made close to the handle.

According to another aspect of the present invention, a head lamp device of a straddle-type vehicle, comprises: a housing; a light unit which emits light in a forward direction in a state in which the light unit is accommodated in the housing; a support point member which supports the light unit in such a manner that the light unit is rotatable; a first tilt member which tilts the light unit in a first direction with respect to the housing in such a manner that the support point member is a support point; and a second tilt member which tilts the light unit in a second direction with respect to the housing in such a manner that the support point member is a support point, wherein the support point member is disposed in the housing at a location that is outward in the rightward and leftward direction, relative to the light unit, and the first tilt member and the second tilt member are disposed in a region of the housing that is closer to a center in the rightward and leftward direction, than the support point member is.

In accordance with this configuration, the size of the head lamp device of the straddle-type vehicle can be reduced as in the above configuration.

The above and further objects, features and advantages of the present invention will more fully be apparent from the following detailed description of preferred embodiments with reference to accompanying drawings.

DETAILED DESCRIPTION OF THE EMBODIMENTS

Hereinafter, the embodiment of the present invention will be described with reference to the drawings. Throughout the drawings, the same or corresponding components are designated by the same reference symbols, and will not be described repeatedly. The stated directions are from the perspective of a rider straddling a motorcycle. A vehicle width direction of the vehicle body of the motorcycle corresponds with a rightward and leftward direction.

Figure 1:
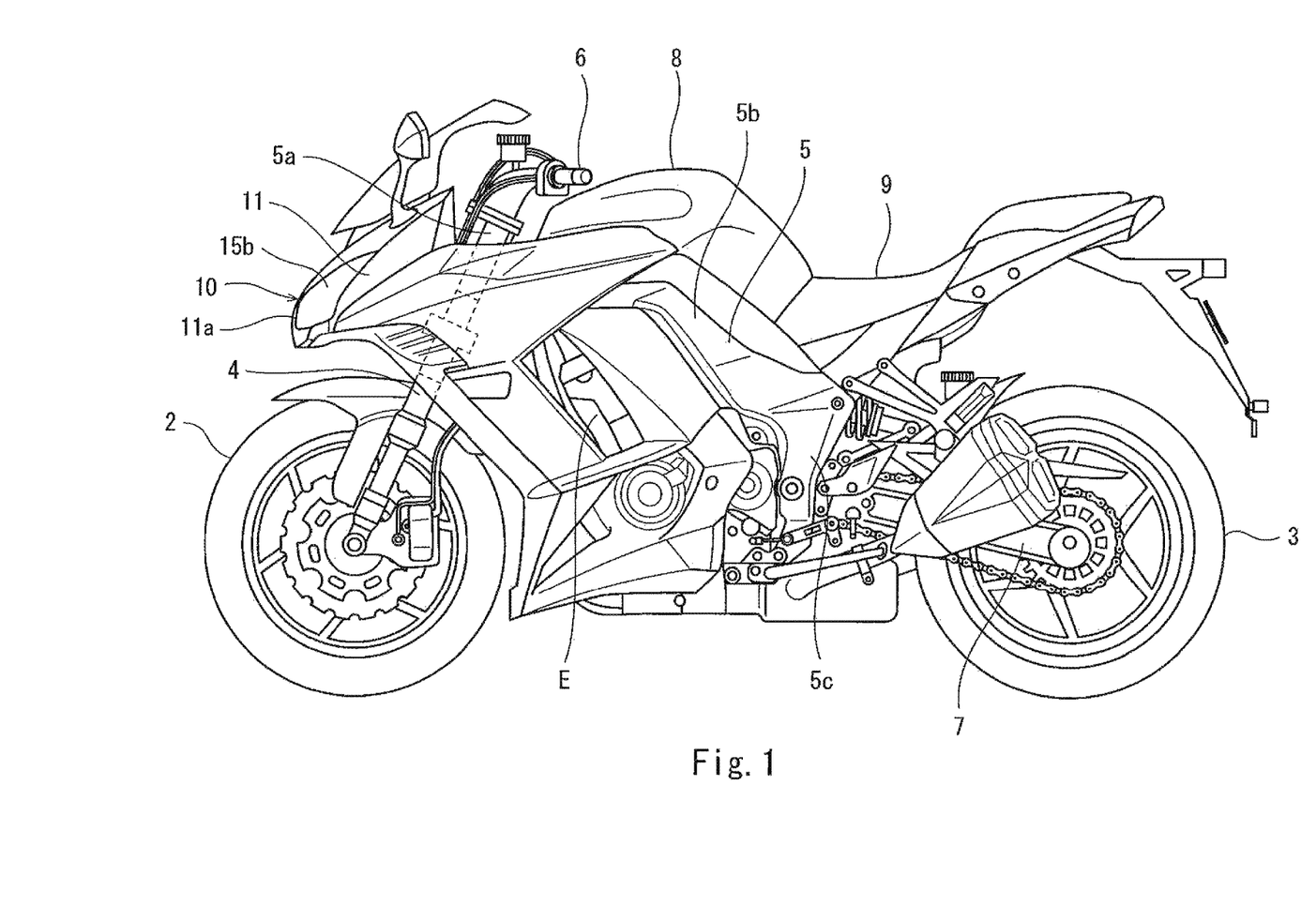
FIG. 1 is a left side view of a motorcycle according to an embodiment.

FIG. 1 is a left side view of a motorcycle 1 according to an embodiment. Referring to FIG. 1, the motorcycle 1 includes a front wheel 2 which is a driven wheel and a rear wheel 3 which is a drive wheel. The front wheel 2 is rotatably mounted on the lower end portions of front forks 4. The front forks 4 are supported on a steering shaft (not shown) via a bracket (not shown) provided at the upper end portions of the front forks 4. The steering shaft is rotatably supported by a head pipe 5a of a vehicle body frame 5. A bar-type handle 6 is attached to the bracket and extends in the rightward and leftward direction. The vehicle body frame 5 includes a main frame 5b extending rearward from the head pipe 5a in such a manner that the main frame 5b is tilted in a downward direction, and a pivot frame 5c connected to the rear portion of the main frame 5b. The front end portion of a swing arm 7 is mounted on the pivot frame 5c in such a manner that the swing arm 7 is vertically pivotable. The rear wheel 3 is rotatably mounted on the rear end portion of the swing arm 7.

A fuel tank 8 is disposed behind the handle 6. A seat 9 which can be straddled by the rider is disposed rearward relative to the fuel tank 8. An engine E is mounted on the main frame 5b and the pivot frame 5c. In the front portion of the motorcycle 1, a head lamp device 10 is fastened to the vehicle body frame 5. When the rider rotates the handle 6, the head lamp device 10 does not move according to the rotation of the handle 6. In the front portion of the motorcycle 1, a cowling 11 is disposed to cover the head lamp device 10, the engine E, and the like from the front. The cowling 11 has openings 11a through which a pair of light transmission sections 15b of the head lamp device 10 are exposed when viewed from the front.

Figure 2:
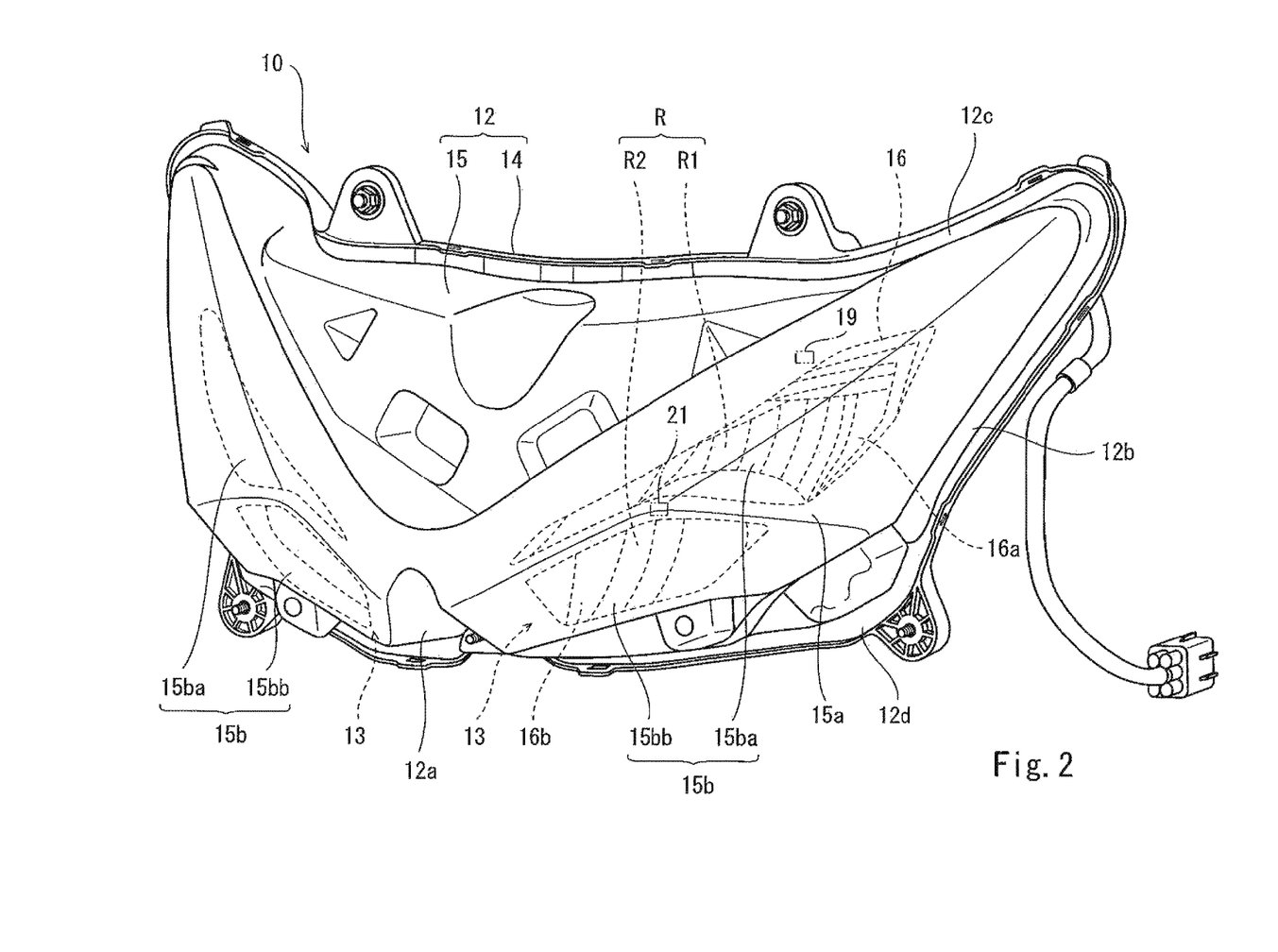
FIG. 2 is a perspective view of a head lamp device of the motorcycle of FIG. 1, when viewed obliquely from the left and the front.

FIG. 2 is a perspective view of the head lamp device 10 of the motorcycle 1 of FIG. 1, when viewed obliquely from the left and the front. As shown in FIG. 2, the head lamp device 10 has a streamline shape in a state in which the head lamp device 10 is fastened to the vehicle body frame 5. More specifically, the head lamp device 10 has a shape in which a dimension in the vehicle width direction (the rightward and leftward direction) and a dimension in a vertical direction are gradually increased, from its front end portion toward its rear portion. When viewed from the front (in a front view), the front end portion of the head lamp device 10 is disposed at a center portion of the motorcycle 1 in the vehicle width direction. Therefore, the head lamp device 10 has a shape in which a dimension in the forward and rearward direction of the center portion in the vehicle width direction is larger than a dimension in the forward and rearward direction of the outer portion in the vehicle width direction.

The head lamp device 10 includes a housing 12, and a pair of light units 13 accommodated in the inner space of the housing 12. The housing 12 includes a rear member 14, and a front member 15 mounted on the rear member 14. The front member 15 is provided with a colored non-transmission section 15a and the pair of light transmission sections 15b through which the light emitted from the pair of light units 13 is transmitted in a forward direction. The light transmission sections 15b which function as outer lenses have a bowl shape protruding forward. The housing 12 has a shape in which a center portion 12a protrudes farther forward than a side end portion 12b does, and the width in the rightward and leftward direction of an upper portion 12c is larger than that of a lower portion 12d. The pair of light units 13 are arranged in the rightward and leftward direction in a state in which the light units 13 are accommodated in the housing 12, and emit light in the forward direction.

The pair of light units 13 include light emission regions R which are disposed apart from each other in the rightward and leftward direction and emit the light. Each of the light emission regions R includes a first light emission region R1 and a second light emission region R2 located below the first light emission region R1. One of the first light emission region R1 and the second light emission region R2 is a low beam region and the other is a high beam region. In the present embodiment, the first light emission region R1 at an upper side is the low beam region, and the second light emission region R2 at a lower side is the high beam region. Each of the light transmission sections 15b of the front member 15 of the housing 12 includes a first light transmission portion 15ba corresponding to the first light emission region R1 and a second light transmission portion 15bb corresponding to the second light emission region R2. The first light transmission portion 15ba and the second light transmission portion 15bb are apart from each other with the non-transmission section 15a interposed between the first light transmission portion 15ba and the second light transmission portion 15bb. Each of the pair of light units 13 includes a reflector body 16. The reflector body 16 includes a first reflector section 16a corresponding to the first light emission region R1, and a second reflector section 16b corresponding to the second light emission region R2.

Figure 3:
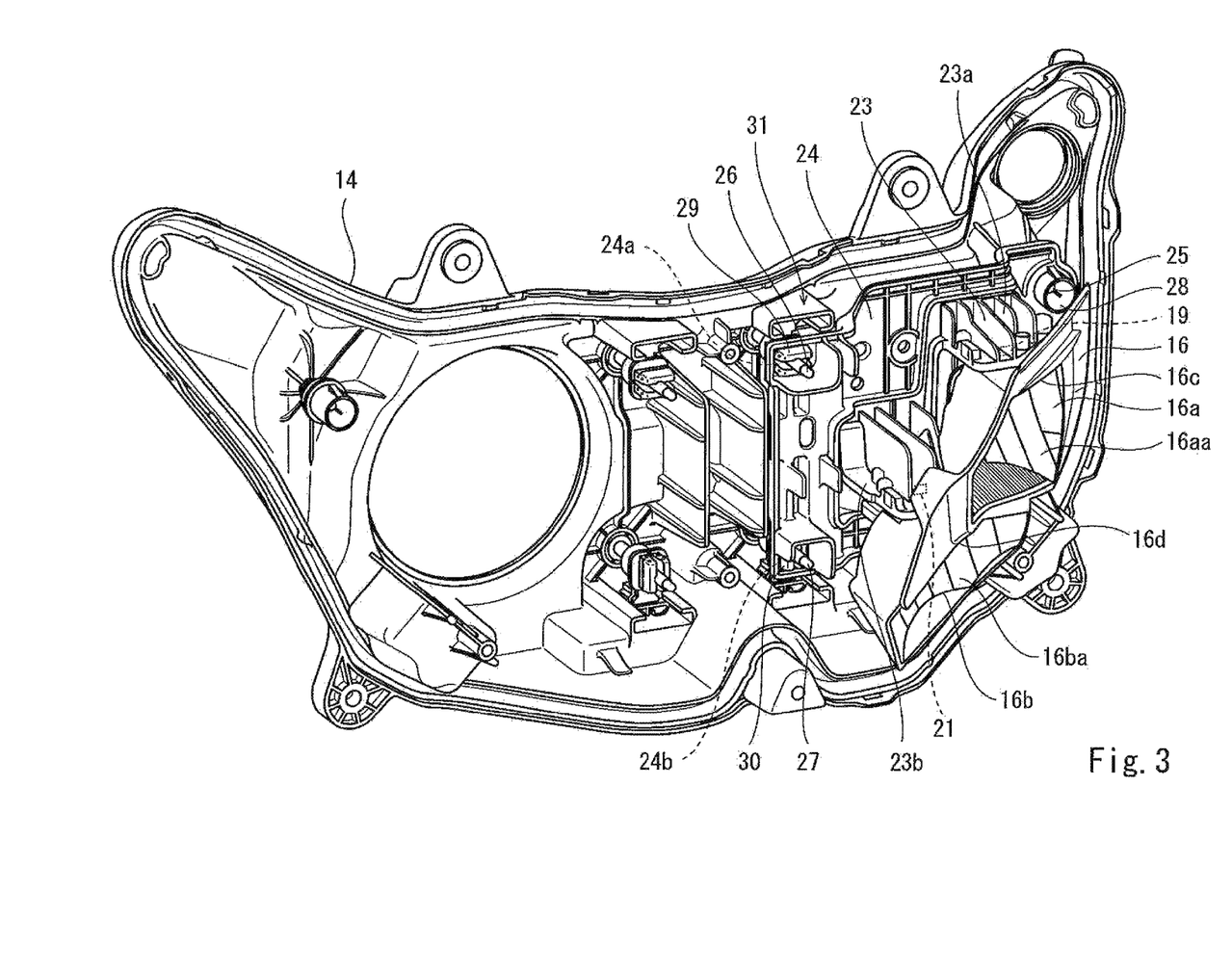
FIG. 3 is a perspective view of the head lamp device of FIG. 2, showing an exploded inner region, when viewed obliquely from the right and the front.
Figure 4:
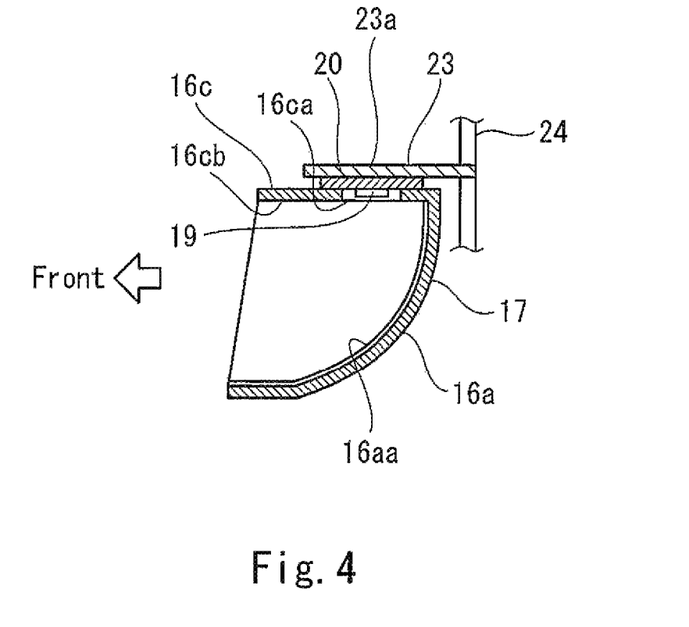
FIG. 4 is a schematic sectional view of the head lamp device of FIG. 3, showing a first reflector section and a region that is in the vicinity of the first reflector section, in a side view.

FIG. 3 is a perspective view of the head lamp device 10 of FIG. 2, showing an exploded inner region, when viewed obliquely from the right and the front. FIG. 4 is a schematic sectional view showing the first reflector section 16a and a region that is in the vicinity of the first reflector section 16a, in a side view, of the head lamp device 10 of FIG. 3. As shown in FIGS. 3 and 4, each of the pair of light units 13 of the head lamp device 10 includes a first LED light source 19, a first substrate 20, a second LED light source 21, a second substrate 22, the reflector body 16, a heat release element 23, and a support member 24. The reflector body 16 is fastened to first and second plate portions 23a, 23b protruding forward, of the heat release element 23. The heat release element 23 is fastened to the support member 24.

The reflector body 16 includes the first reflector section 16a which reflects in the forward direction the light emitted from the first LED light source 19, the second reflector section 16b which reflects in the forward direction the light emitted from the second LED light source 21, a first plate section 16c which is disposed at a location that is outward of the first reflector section 16a in a direction perpendicular to the forward and rearward direction, to be precise, above the first reflector section 16a, and in the vicinity of the first LED light source 19, and a second plate section 16d which is disposed at a location that is outward of the second reflector section 16b in the direction perpendicular to the forward and rearward direction, to be precise, above the second reflector section 16b, and in the vicinity of the second LED light source 21. The first reflector section 16a, the second reflector section 16b, the first plate section 16c, and the second plate section 16d are integrated with each other as the reflector body 16. The first LED light source 19, the second LED light source 21, the first reflector section 16a, the second reflector section 16b, the first plate section 16c, and the second plate section 16d are supported on the common support member 24.

A first reflection surface 16aa (front surface) of the first reflector section 16a is provided with a coaling film comprising a reflective material. The first LED light source 19 is disposed outward of the first reflector section 16a in the direction perpendicular to the forward and rearward direction, to be precise, above the first reflector section 16a. The first LED light source 19 is mounted on the first substrate 20. The first substrate 20 is fastened to the first plate portion 23a of the heat release element 23. The first LED light source 19 emits the light in a downward direction toward the first reflector section 16a. The light is emitted from the first LED light source 19 and reflected on the first reflector section 16a. The reflected light travels in the forward direction. Then, the light is transmitted through the first light transmission portion 15ba and a front region of the motorcycle 1 is irradiated with this light.

The first plate section 16c is disposed at a location that is above the first reflector section 16a and in the vicinity of the first LED light source 19. The first plate section 16c is provided with a first through-hole 16ca. The first LED light source 19 is exposed toward the first reflector section 16a through the first through-hole 16ca. The size of the first through-hole 16ca is larger than that of the first LED light source 19 and smaller than that of the first substrate 20.

A first base body 17 including the first reflector section 16a and the first plate section 16c which are integrated with each other has a bowl shape which is opened in the forward direction. A second base body 18 including the second reflector section 16b and the second plate section 16d which are integrated with each other has a bowl shape which is opened in the forward direction. The first base body 17 is integrated with the second base body 18 in a state in which the first base body 17 is deviated from the second base body 18 in the rightward and leftward direction, in the vertical direction, and in the forward and rearward direction. More specifically, the first base body 17 is integrated with the second base body 18 in a state in which the first base body 17 is located outward in the rightward and leftward direction relative to the second base body 18, above the second base body 18, and rearward of the second base body 18. The first through-hole 16ca is provided in a portion of the peripheral surface of the first base body 17 with the bowl shape to pass therethrough the light emitted from the first LED light source 19. Although in the example of FIG. 4, the structure of the first base body 17 side is described in detail, the structure of the second base body 18 side is the same as that of the first base body 17 side, and will not be described in detail.

The head lamp device 10 further includes a pair of optical axis adjustment mechanisms 31 corresponding to the pair of right and left light units 13, respectively. Each of the pair of optical axis adjustment mechanisms 31 includes a support point member 25, a first screw 26 (first tilt member), and a second screw 27 (second tilt member). Each of the pair of right and left light units 13 is supported on the housing 12 at three points which are the support point member 25, the first screw 26, and the second screw 27. The support point member 25 protrudes toward the support member 24 in a state in which the support point member 25 is fastened to the housing 12. The support point member 25 supports the light unit 13 in such a manner that the light unit 13 is rotatable. Specifically, the tip end portion of the support point member 25 is provided with a spherical convex portion which is slidably fitted to a spherical concave portion of a receive member 28 of the support member 24. This makes it possible to form a spherical bearing. The light unit 13 is supported in such a manner that the light unit 13 is rotatable around a sphere as a support point.

The first screw 26 is threadingly engaged with a first female thread member 29 provided on the support member 24. The first screw 26 causes the light unit 13 to be tilted in a first direction φ1 with respect to the housing 12 in such a manner that the support point member 25 is a support point. More specifically, when the first screw 26 is rotated in a forward direction or in a reverse direction, the light unit 13 is tilted around a tilt axis which is a first virtual line L1 (see FIG. 5) connecting the support point member 25 to the second screw 27. The second screw 27 is threadingly engaged with a second female thread member 30 provided on the support member 24. The second screw 27 causes the light unit 13 to be tilted in a second direction φ2 different from the first direction φ1 with respect to the housing 12 in such a manner that the support point member 25 is a support point. More specifically, when the second screw 27 is rotated in a forward direction or in a reverse direction, the light unit 13 is tilted around a tilt axis which is a second virtual line L2 (see FIG. 5) connecting the support point member 25 to the first screw 26. By rotating the first screw 26 and the second screw 27, the optical axis of the light unit 13 can be adjusted. The screws 26, 27 and the female thread members 29, 30 are accommodated in a light unit accommodating space surrounded by the rear member 14 and the front member 15.

In a configuration in which the light unit 13 can be tilted, the female thread members 29, 30 are required to have an adequate size to allow the screws 16, 27 to be stably relatively moved in the forward and rearward direction. For this reason, compared to a configuration in which the light unit 13 cannot be tilted, the female thread members 29, 30 and regions which are in the vicinity of the female thread members 29, 30 tend to be increased in size. The support member 24 is provided with portions supporting the female thread members 29, 30 in such a manner that the portions are integrated with the support member 24. Specifically, the support member 24 is formed with engagement holes 24a, 24b with a non-perfect circle shape (e.g., rectangular shape). Portions of the female thread members 29, 30 which are to be fitted to the engagement holes 24a, 24b, respectively, also have a non-perfect circle shape (e.g., rectangular shape). The female thread members 29, 30 are inserted into the engagement holes 24a, 24b of the support member 24, respectively, and engaged with the support member 24 in such a manner that the female thread members 29, 30 are not relatively displaceable and not relatively rotatable.

Figure 5:
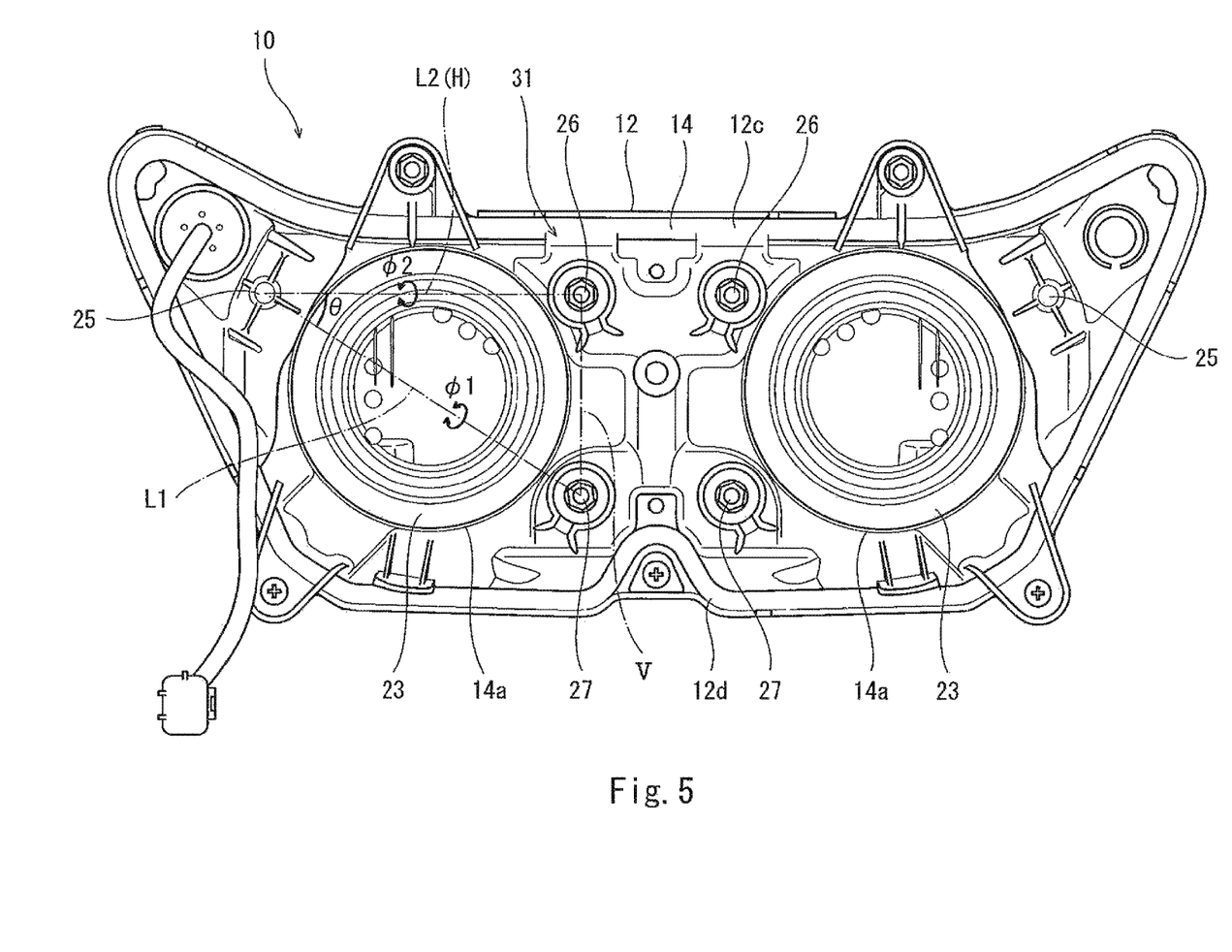
FIG. 5 is a rear view of the head lamp device of FIG. 2.

FIG. 5 is a rear view of the head lamp device 10. As shown in FIGS. 4 and 5, the support point member 25 is disposed in an outward region of the housing 12 in the rightward and leftward direction, while the first and second screws 26, 27 are disposed in a center region of the housing 12 in the rightward and leftward direction. The support point member 25 and the first screw 26 are disposed in an upper portion 12c of the housing 12. The support point member 25 and the first screw 26 are coupled to the upper portion of the support member 24. The second screw 27 is disposed in a lower portion 12d of the housing 12. The second screw 27 is coupled to the lower portion of the support member 24. The support point member 25 and the first screw 26 are arranged (aligned) in a horizontal direction. The second screw 27 and the first screw 26 are arranged (aligned) in a vertical direction. When the head lamp device 10 is viewed from the rear, the first virtual line L1 connecting the support point member 25 to the second screw 27 is a tilt line which is tilted with respect to the horizontal direction and the vertical direction. The first virtual line L1 is tilted at a predetermined angle θ (e.g., 50 degrees≥θ

Specifically, the support point member 25 and the first screw 26 are disposed on a horizontal line H. In other words, when the head lamp device 10 is viewed from the rear, the second virtual line L2 connecting the support point member 25 to the first screw 26 is the horizontal line. The first screw 26 and the second screw 27 are disposed on a vertical line V. When the head lamp device 10 is viewed from the rear, a triangle formed by connecting the support point member 25, the first screw 26 and the second screw 27 to each other is a right triangle.

The rear member 14 of the housing 12 is provided with a pair of heat release holes 14a through which the heat release elements 23 of the pair of light units 13 are exposed. The first screws 26 and the second screws 27 are disposed between the pair of heat release holes 14a in the rightward and leftward direction. The support point members 25 are disposed outward in the rightward and leftward direction relative to the pair of heat release holes 14a, respectively. In other words, the first screws 26 and the second screws 27 are disposed between the pair of heat release elements 23 in the rightward and leftward direction, and the support point members 25 are disposed outward in the rightward and leftward direction relative to the pair of heat release elements 23, respectively.

Figure 6:
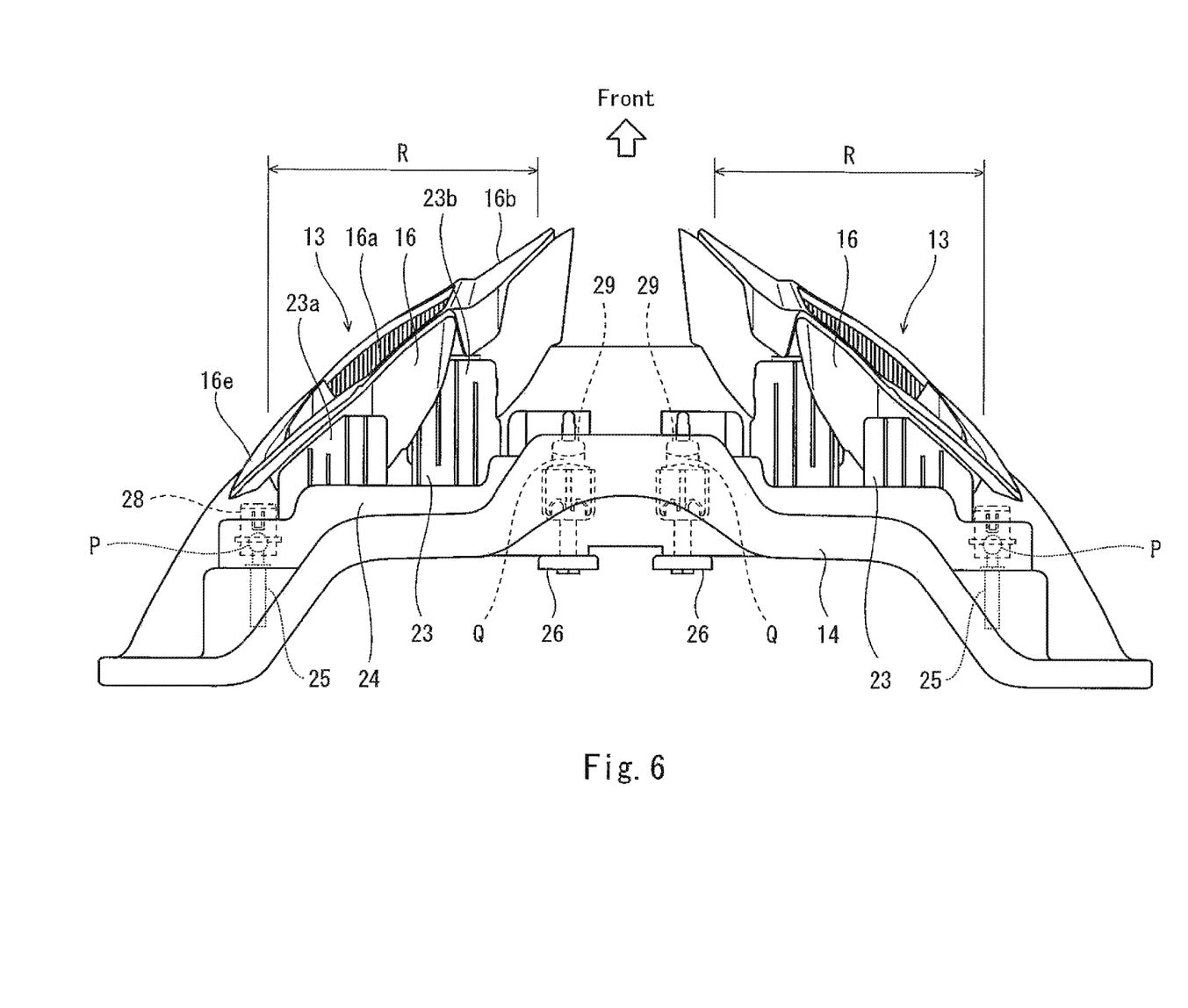
FIG. 6 is a plan view of the head lamp device of FIG. 2, showing an exploded inner region, when viewed from above.

FIG. 6 is a plan view of the head lamp device 10 of FIG. 2, showing an exploded inner region, when viewed from above. As shown in FIG. 6, a support position P at which the support member 24 is supported by the support point member 25 and a support position Q at which the support member 24 is supported by the first and second screws 26, 27 are deviated from each other in the forward and rearward direction. More specifically, the support position P is located rearward of the support position Q. In this layout, the support point member 25 is located rearward of the first and second screws 26, 27. The support point members 25 are disposed outward in the rightward and leftward direction relative to the light emission regions R of the pair of light units 13, respectively. A virtual line extending through each of the support point members 25 crosses an outer end portion 16e of the reflector body 16 in the rightward and leftward direction. The first and second screws 26, 27 are disposed between the light emission regions R of the pair of light units 13. The first and second screws 26, 27 are disposed in a space formed between the pair of light units 13.

In the above-described configuration, the first and second screws 26, 27 which require elongated spaces in the forward and rearward direction are disposed in the center region of the housing 12 in the rightward and leftward direction, and the support point members 25 which do not require elongated spaces in the forward and rearward direction are disposed in the outward regions of the housing 12 in the rightward and leftward direction. In this layout, a dimension in the forward and rearward direction of the outward regions in the rightward and leftward direction, of the head lamp device 10 can be reduced. This makes it possible to reduce the size of the whole of the head lamp device 10 of the motorcycle 1 including the optical axis adjustment mechanisms 31. In addition, because of the reduction of the dimension in the forward and rearward direction of the outward regions in the rightward and leftward direction, of the head lamp device 10, the head lamp device 10 can be formed in a sharp streamline shape, and thus air resistance can be reduced.

Since the first virtual line L1 connecting the support point member 25 to the second screw 27 is tilted with respect to the horizontal direction and the vertical direction, the light unit 13 is displaced in the vertical direction and in the horizontal direction at the same time, in the adjustment performed by use of the first screw 26. However, since the second virtual line L2 connecting the support point member 25 to the first screw 26 is the horizontal line, the light unit 13 is displaced only in the vertical direction (namely, around the horizontal line (around the second virtual line L2), in the adjustment performed by use of the second screw 27. An operator performs the optical axis adjustment only in the horizontal direction by use of the first screw 26, and then performs the optical axis adjustment only in the vertical direction by use of the second screw 27. In this way, an operation for the optical axis adjustment is completed. Therefore, even in the configuration in which the first virtual line L1 connecting the support point member 25 to the second screw 27 is tilted with respect to the horizontal direction and the vertical direction, the operation for the optical axis adjustment does not become complex.

Since the support point members 25 disposed in the outward regions, respectively, of the housing 12 in the rightward and leftward direction, are located in the upper portion 12c of the housing 12, a dimension in the rightward and leftward direction of the lower portion 12d of the housing 12 of the head lamp device 10 can be reduced. This makes it possible to reduce a width of the motorcycle 1 at a height position of the lower portion of the head lamp device 10. Since the first and second screws 26, 27 are disposed between the light emission regions R in the rightward and leftward direction, the first and second screws 26 27 can be easily disposed to overlap with the light units 13 when viewed from the side (in a side view). As a result, the dimension in the forward and rearward direction of the head lamp device 10 can be reduced.

Since the dimension in the forward and rearward direction of the support point members 25 is smaller than that of the first and second screws 26, 27, and each of the support point members 25 is disposed outward in the rightward and leftward direction relative to the light emission region R, a dimension in the forward and rearward direction of the side end portion 12b of the housing 12 of the head lamp device 10 can be reduced. Since the support point members 25 are disposed rearward of the first and second screws 26, 27, the head lamp device 10 can be formed in a sharp streamline shape, with a width reduced in the forward direction.

Since each of the pair of light units 13 includes the LED light sources 19, 21 in which a light emission angle is small, and the size of the reflector body 16 can be reduced, the dimension in the forward and rearward direction of the light unit 13 can be reduced. The reduction of the size of the light unit 13 significantly affects the spaces of the screws 26, 27 for the optical axis adjustment which impedes reduction of the dimension in the forward and rearward direction of the housing 12. However, with the above-described configuration, the size of the head lamp device 10 can be reduced.

Since the optical axis adjustment mechanisms 31 are provided independently at the right and left sides, respectively, manufacturing errors and mounting errors of the right and left light units 13 can be easily absorbed. Since the LED light sources 19, 21 are mounted on the surface perpendicular to the forward and rearward direction, the LED light sources 19, 21 can be disposed in front of the rear member 14 of the housing 12. Therefore, the heat release elements 23 can be disposed along the forward and rearward direction, and heat can be released effectively.

Since the first and second screws 26, 27 are deviated from the heat release element 23 and the reflector body 16 in the direction perpendicular to the forward and rearward direction, namely in the vertical direction and in the rightward and leftward direction, interference between the first and second screws 26, 27, and the heat release element 23 and the reflector body 16 can be prevented. Specifically, since the front end portions of the first and second screws 26, 27 are disposed in front of the rear end portion of the heat release element 23 and the rear end portion of the reflector body 16, an increase in the size of the head lamp device 10 can be prevented by efficiently utilizing the inner space of the housing 12.

Figure 7A:
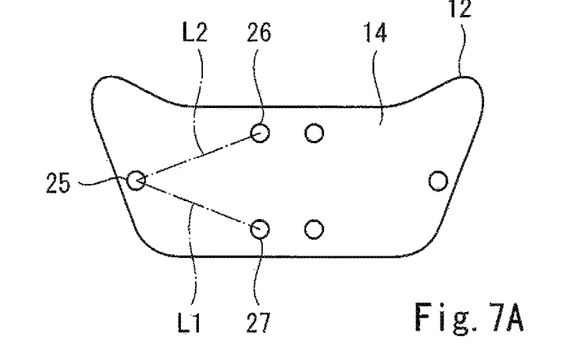
FIGS. 7A to 7C are schematic rear views of head lamp devices according to Modified Examples, respectively.
Figure 7B:
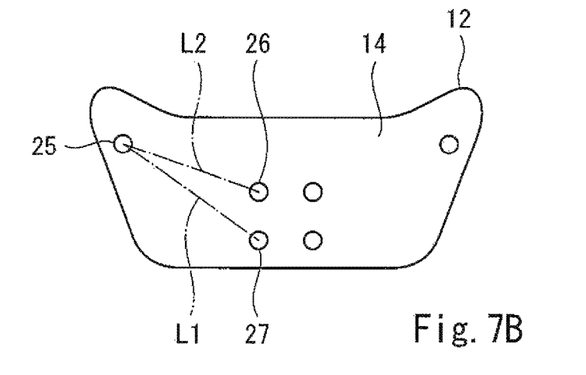
Figure 7C:
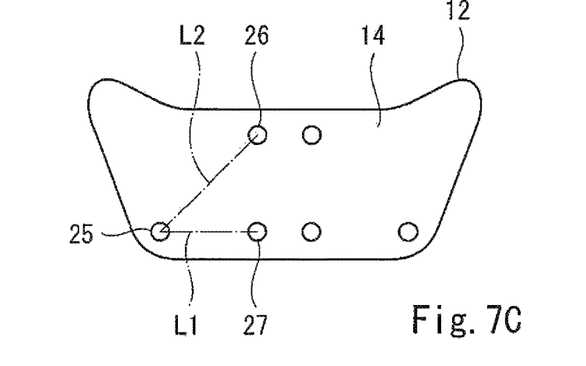

The present invention is not limited to the above-described embodiment, and the configuration may be changed, added, or deleted. For example, as shown in FIG. 7A, the support point member 25 may be disposed between the first and second screws 26, 27 in the vertical direction. Or, as shown in FIG. 7B, the first and second screws 26, 27 may be set to be lower than the support point member 25. Or, as shown in FIG. 7C, the first virtual line L1 connecting the support point member 25 to the second screw 27 may be a horizontal line.

The light unit 13 may be a direct-emission light which is not provided with a reflector. Further, the first and second screws 26, 27 may be configured to adjust the optical axis by fixing the reflector and displacing the light source. Although in the above-described embodiment, the female thread members 29, 30 are mounted on the light unit 13, and the first and second screws 26, 27 formed with male threads are mounted on the housing 12, the screws 26, 27 may be supported on the light unit 13 and the female thread members 29, 30 may be supported on the housing 12.

The head lamp device 10 may include two lights instead of the four lights. Thus, the number of light sources is not limited. The light units 13 may be integrated in the rightward and leftward direction, instead of being separated in the rightward and leftward direction. As the support structure and tilting structure of the light unit 13, other structures may be used. For example, the tip end portion of the support point member 25 may be provided with the spherical concave portion, and the receive member may be provided with the spherical convex portion. Likewise, the support member 24 may be provided with the screw members, and the housing 12 may be provided with the female thread members. The light sources 19, 21 may be filament light sources or valve type light sources, instead of the LED light sources. To reduce the size of the reflector, the light emitting elements in which the light emission angle is less than 180 degrees are preferably used as the light sources. The straddle-type vehicle is not limited to the motorcycle, and may be other vehicles such as an all-terrain vehicle (ATV) so long as the vehicle includes the seat which can be straddled by the rider.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention.

The invention claimed is:

1. A head lamp device of a straddle-type vehicle, the head lamp device comprising:
    a housing;
    a pair of light units which are disposed at right and left sides, respectively, in a rightward and leftward direction in a state in which the pair of light units are accommodated in the housing, and emit light in a forward direction;
    a pair of support point members which support the pair of light units, respectively in such a manner that the pair of light units are rotatable;
    a pair of first tilt members which tilt the pair of light units, respectively in a first direction with respect to the housing in such a manner that the pair of support point members are support points; and
    a pair of second tilt members which tilt the pair of light units, respectively in a second direction with respect to the housing in such a manner that the pair of support point members are support points,
    wherein the pair of support point members are disposed in outward regions, respectively, of the housing in the rightward and leftward direction, and the pair of first tilt members and the pair of second tilt members are disposed in a center region of the housing in the rightward and leftward direction.

2. The head lamp device according to claim 1,
    wherein each of the pair of second tilt members and a corresponding one of the pair of first tilt members are arranged in a vertical direction, and
    wherein each of the pair of first tilt members and a corresponding one of the pair of support point members are arranged on a horizontal line.

3. The head lamp device according to claim 1,
    wherein the pair of support point members are disposed in an upper portion of the housing.

4. The head lamp device according to claim 1,
    wherein the pair of light units include light emission regions, respectively, which are apart from each other in the rightward and leftward direction and emit the light, and
    wherein the pair of first tilt members and the pair of second tilt members are disposed between the light emission regions in the rightward and leftward direction.

5. The head lamp device according to claim 1,
    wherein the pair of light units include light emission regions which are apart from each other in the rightward and leftward direction and emit the light, and
    wherein the pair of support point members are disposed outward in the rightward and leftward direction relative to the light emission regions, respectively.

6. The head lamp device according to claim 1,
    wherein each of the pair of light units includes a LED light source, and a reflector which reflects in a forward direction the light emitted from the LED light source.

7. The head lamp device according to claim 1,
    wherein the head lamp device is fastened to a vehicle body frame of the straddle-type vehicle.

8. A head lamp device of a straddle-type vehicle, the head lamp device comprising:
    a housing;
    a light unit which emits light in a forward direction in a state in which the light unit is accommodated in the housing;
    a support point member which supports the light unit in such a manner that the light unit is rotatable;
    a first tilt member which tilts the light unit in a first direction with respect to the housing in such a manner that the support point member is a support point; and
    a second tilt member which tilts the light unit in a second direction with respect to the housing in such a manner that the support point member is a support point,
    wherein the support point member is disposed in the housing at a location that is outward in a rightward and leftward direction, relative to the light unit, and the first tilt member and the second tilt member are disposed in a region of the housing that is closer to a center in the rightward and leftward direction, than the support point member is.

* * * * *